Aug. 30, 1949.      L. L. WEISGLASS      2,480,101
ILLUMINATING SYSTEM FOR PHOTOGRAPHIC ENLARGERS
Filed Aug. 9, 1945                          5 Sheets-Sheet 2
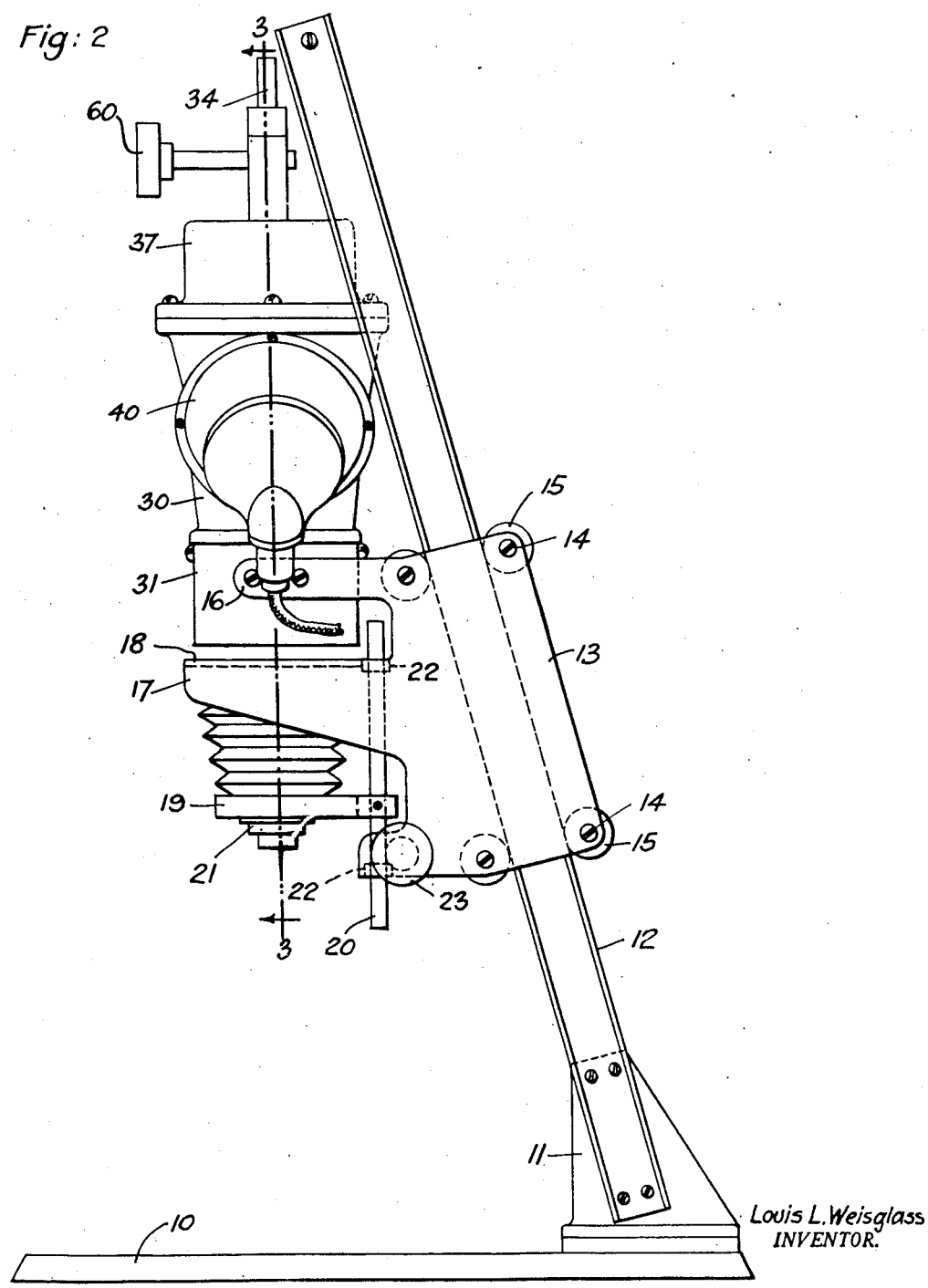
Louis L. Weisglass
INVENTOR.
BY Walter E. Wallheim
ATTORNEY.

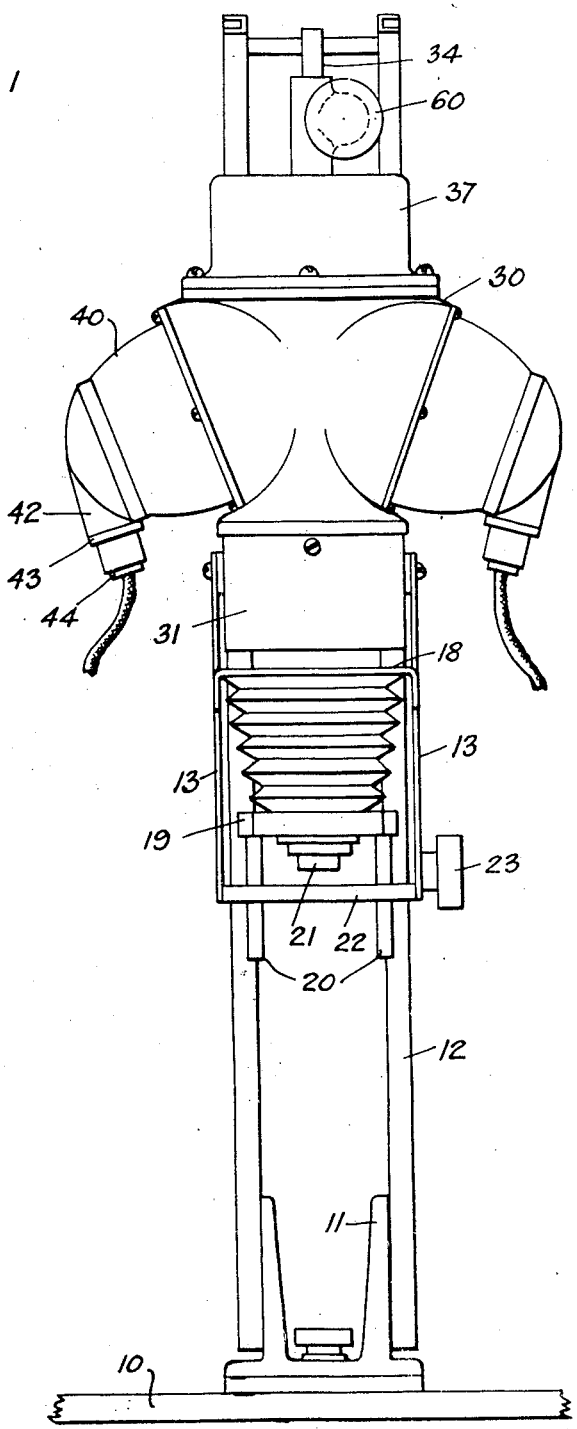

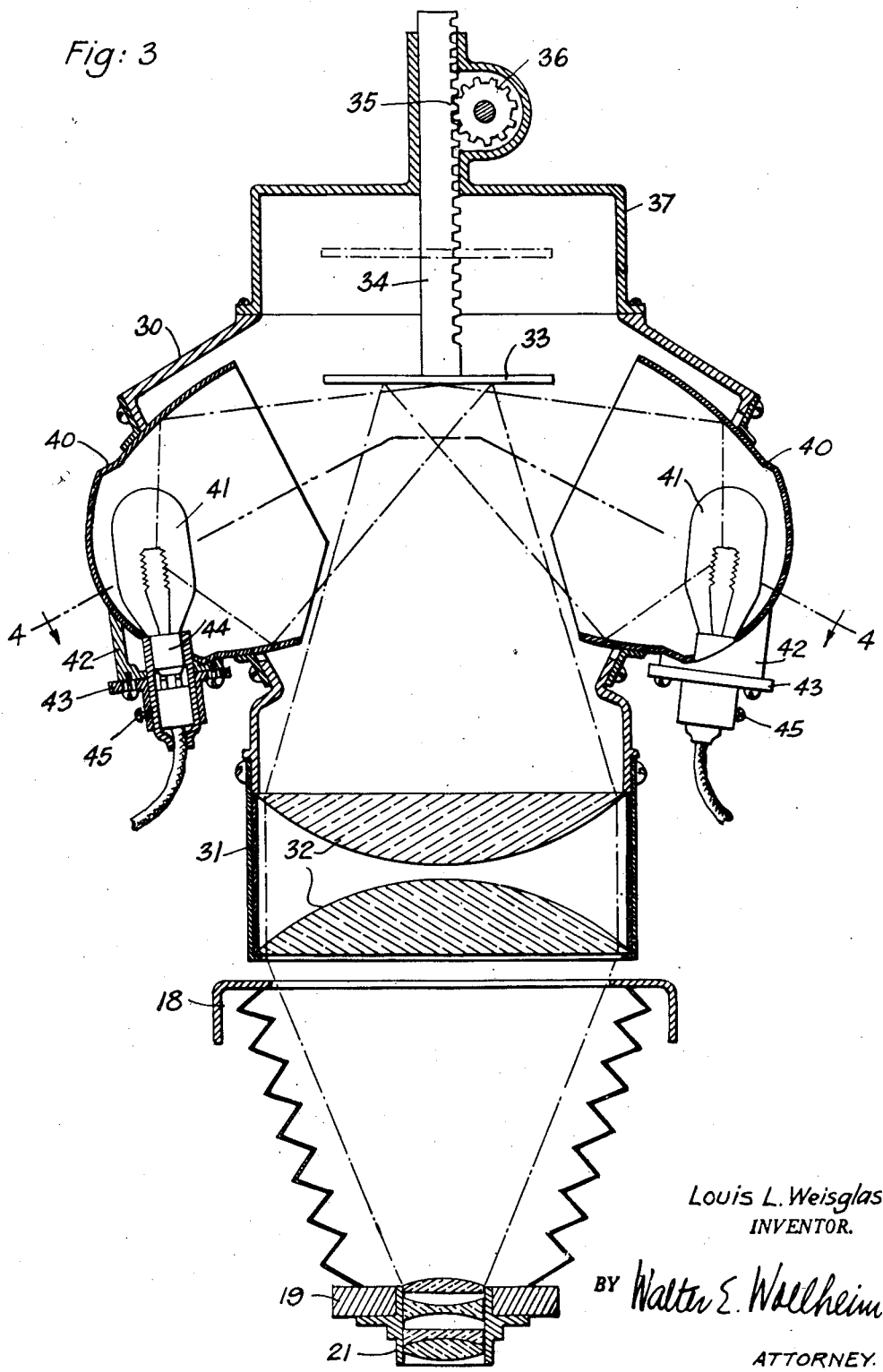

Aug. 30, 1949.  L. L. WEISGLASS  2,480,101
ILLUMINATING SYSTEM FOR PHOTOGRAPHIC ENLARGERS
Filed Aug. 9, 1945  5 Sheets-Sheet 4
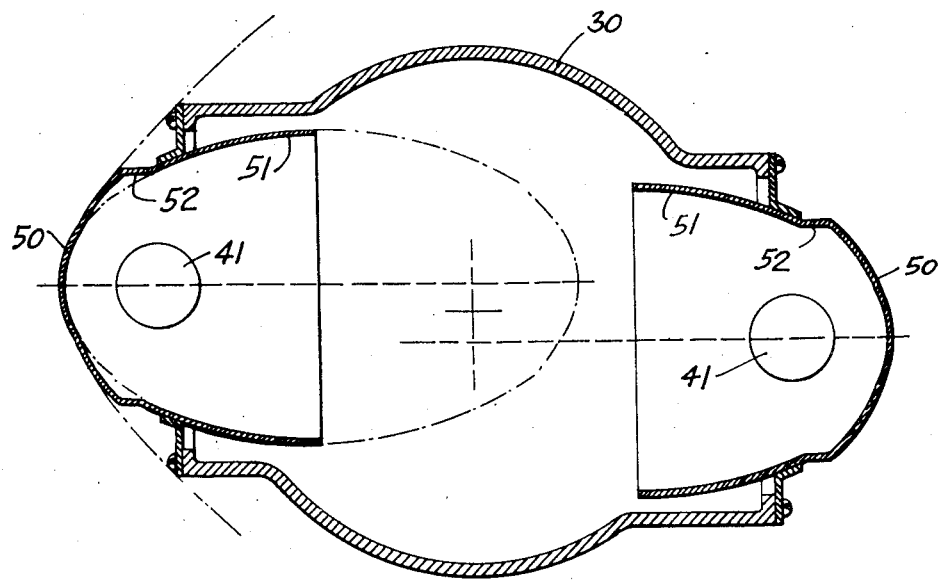
Fig: 4
Louis L. Weisglass
INVENTOR.
BY Walter E. Wollheim
ATTORNEY.

Aug. 30, 1949.   L. L. WEISGLASS   2,480,101
ILLUMINATING SYSTEM FOR PHOTOGRAPHIC ENLARGERS
Filed Aug. 9, 1945   5 Sheets-Sheet 5
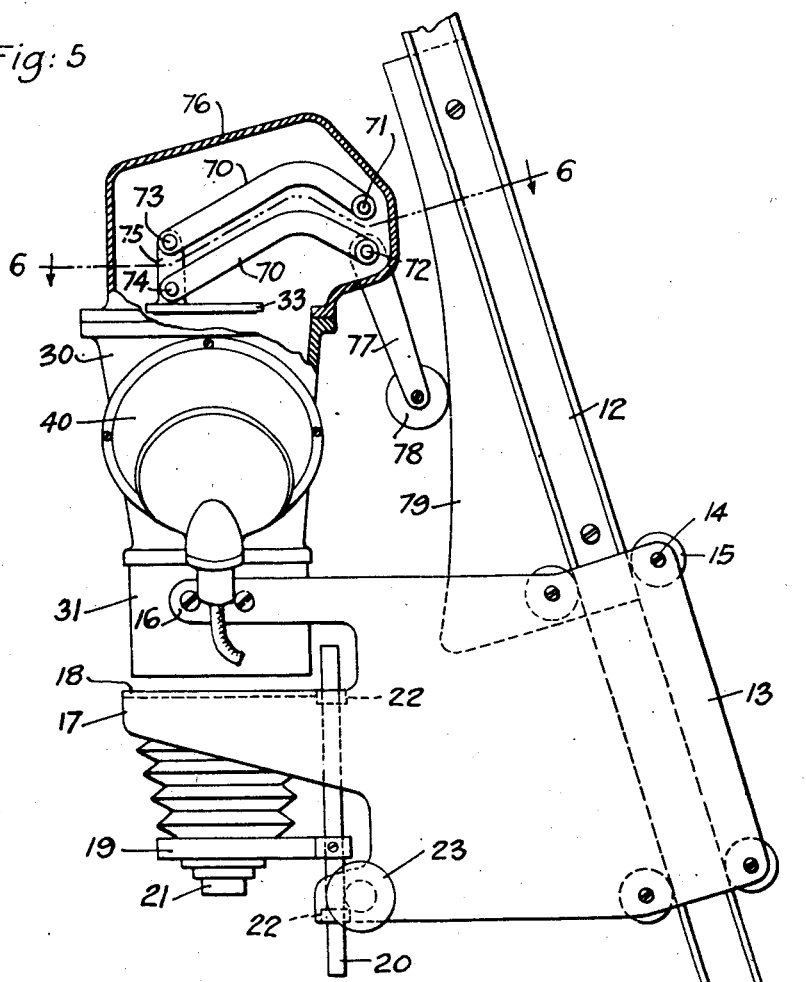
Fig: 5
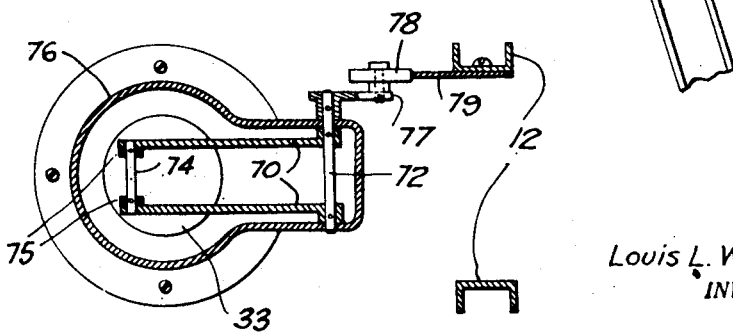
Fig: 6
Louis L. Weisglass
INVENTOR.
BY Walter E. Wollheim
ATTORNEY.

Patented Aug. 30, 1949

2,480,101

UNITED STATES PATENT OFFICE

2,480,101

ILLUMINATING SYSTEM FOR PHOTOGRAPHIC ENLARGERS

Louis L. Weisglass, New York, N. Y., assignor, by mesne assignments, to Simmon Brothers, Inc., Long Island City, N. Y., a corporation of New York Application August 9, 1945, Serial No. 609,873

1 Claim. (Cl. 88—24)

This invention pertains to an improved illuminating system for photographic enlargers. It is based on the following considerations:

The design of the most successful type of photographic enlarger is based on two premises:

1. It is necessary to use diffused light. This is due to the peculiar light scattering property of the photographic emulsion, commonly known as the "Callier effect"; the apparent contrast of a photographic image depends upon the type of light to which it is exposed, specular or entirely undiffused light forming images of extreme and unusable contrast, but diffused light producing softer prints.

2. It is desirable to use condensers unless one wants to be limited to an extremely low level of light intensity.

These two conditions were satisfied in the past by the customary arrangement of a diffused source of light represented by an incandescent lamp with an opal vessel positioned substantially in the focal point of a condenser. This arrangement has the following disadvantages:

a. Half of the light of the lamp is emitted rearwardly and lost and cannot be recovered by the use of reflectors since the lamp is so large that the reflected light would have to pass the lamp again. The opal vessel then absorbs ⅔ of the remaining light. As a result, approximately only ⅓ of ½=⅙ or 16.6% of the light can be utilized.

b. It is impossible to obtain higher levels of intensity by increasing the wattage of the lamp. A condenser system is so adjusted that an image of the lamp is projected into the pupil of the enlarging lens. It is desirable that this image be as large or even slightly larger than the pupil of the lens, but it should not be appreciably larger, since light which falls outside of the margins of the lens is obviously lost. This means that the size of the lamp should not exceed certain limits, and this, in turn, imposes a very definite limitation upon the wattage which can be used in such a system. Broadly speaking, it cannot be much larger than 150 watt.

These two limitations are overcome in my invention. Instead of the aforementioned lamp with an opal glass vessel, I use a diffuse reflector made from white opaque material substantially in the focal point of the condenser. This reflector is, in turn, illuminated by a suitable spotlight, or by several spotlights. These spotlights may be constructed in many ways, but I prefer a suitable source of light such as an incandescent lamp, of the type used in lantern slide or movie projectors, together with a specular reflector of at least partly ellipsoidal shape.

A well designed spotlight of this type will concentrate approximately 70% of the light emitted by the lamp on a selected spot of the diffuse reflector. A diffuse reflector built from a well chosen white opaque material will reflect as much as 90% or more of this light. The efficiency of the system will then be .70×.90=.63 or 63%. This is almost four times as high as the 16.6% computed for the conventional system using an opal lamp. These figures have been verified by actual experiments with a very good degree of approximation.

This computation shows that the performance of my system is due to the utilization of the superior light reflecting properties of certain white opaque substances. It is a scientific fact that these substances reflect light better than specular reflectors, i. e., mirrors.

In addition to this superior efficiency, there is now no longer any limitation upon the wattage that can be utilized in an enlarger of this type. I have successfully built an enlarger with a diffuse white reflector according to the principles of this invention which was illuminated by two spotlights of 200 watt each. Compared to a conventional enlarger with an input of 75 watt, this enlarger had a light output approximately 16 to 20 times as large in spite of the fact that the wattage was only slightly more than five times as high.

The broad principle of an illuminating system of this type has been disclosed in my co-pending application, Serial No. 577,216, now abandoned.

The object of this present invention is to provide improved means for a more nearly uniform illumination of the aforementioned diffusely reflecting surface which is disposed substantially in the focal point of a condenser. A further object of this invention is improved means to control the intensity of the illumination. A further object of this invention is to provide an improved material for said reflecting body which is superior to the body of magnesium carbonate which has been described in my prior application, Serial No. 577,216.

The first object, i. e., a more nearly uniform illumination of the diffuse reflector, I obtain by a combination of three means, namely, first by providing a spotlight with a specular reflector of peculiar shape composed partly of a paraboloid and partly of an ellipsoid body of rotation, second, by using a plurality of these spotlights, and third, by having the axis of these spotlights slightly offset in different directions with respect to the optical axis of the enlarger.

The second object, i. e., control of the intensity of the illumination, is obtained by arranging the diffuse reflector in a plane perpendicular to the optical axis of the condenser and the enlarger lens and by providing means to shift this diffuse reflector in the direction of said optical axis. This, in effect, defocuses the reflector, both with respect to the spotlight and with respect to the condenser. A very efficient control of the illumination is provided thereby, and it is possible to control the illumination from its highest intensity, 100%, to a value as low as 4% thereof.

This light intensity control is so simple that it lends itself very easily to an automatic arrangement, whereby the position of the diffusely reflecting plate and thereby the light intensity, may be controlled by a cam in dependence of the distance between the projector assembly and the easel which supports the bromide paper. The cam used for this purpose may have any desired configuration and the light output may follow almost any law, but the most useful arrangement is the one in which the intensity of the light impinging upon a unit area of the bromide paper supported on the easel is kept constant and independent of the aforementioned distance between projector and easel. In this manner, the exposure time for any given negative becomes independent of the magnification ratio. This simplifies the technique of making enlargements considerably and is a great convenience to the operator.

The third object of the invention is to provide a better material for said diffusely reflecting plate. The magnesium carbonate used heretofore is a very efficient reflector, but it has very poor mechanical properties, is a poor conductor of heat, and decomposes into powder quite readily. I have found that for all practical purposes, a metal plate coated with vitreous enamel is just as efficient, but has much superior mechanical properties, is a good heat conductor, and is much more durable. Certain safeguards have to be provided to eliminate the effect of the surface gloss which such vitreous enamel coating has. This can be done by either sand blasting it, or by arranging the plate under such an angle that only the diffuse reflection, which constitutes approximately 90% of the total light, reaches the condenser, but that the remaining specularly reflected light, which usually does not exceed 10% of the total light, becomes reflected under such an angle that it will not reach the condenser of the enlarger. More specifically, this means that the angle between the central ray of the light emitted from the spotlight and the optical axis of the condenser must be less than twice as large than the angle between said central ray, and a straight line perpendicular to said diffuse white reflector.

In the accompanying drawings, Fig. 1 is a front elevational view of a photographic enlarger embodying the principles of my invention;

Fig. 2 is a side view of the same;

Fig. 3 is a vertical sectional view along the plane of line 3—3 in Fig. 2, drawn to a larger scale;

Fig. 4 is a horizontal sectional view along the plane of line 4—4 in Fig. 3;

Fig. 5 is a side view, partly in section, of a modified projector assembly adapted for automatic intensity control; and Fig. 6 is a horizontal sectional view along the plane of line 6—6 in Fig. 5.

Like characters of reference denote similar parts throughout the several views and the following specification.

The enlarger consists of three principal parts, a base, an upright column and a projector assembly.

The base 10 is preferably made from plywood or the like. On this base is fastened a bracket 11, preferably made from cast iron or aluminum which supports two U-channels 12. These channels are arranged either vertically or, preferably, under a slight angle as shown. Slidably mounted on this vertical or nearly vertical column is the projector assembly. This projector assembly consists of a supporting carriage, a focusing assembly with an enlarging lens, and a lamphousing.

The carriage consists of two steel plates 13 which are bolted together by four bolts 14. These bolts serve at the same time as shafts for rollers 15 by means of which the carriage slides with a small amount of friction on the aforementioned channels 12.

The steel plates 13 have a configuration clearly shown in Fig. 2. Each steel plate has a lug 16 adapted to support the lamphousing. A projection 17 is provided which supports a film stage 18 which, of course, has an aperture of the desired size. The negative, preferably supported by one of the well known types of holders is, during operation, placed on this apertured film stage 18. A film holder suitable for this purpose is, for example, shown in either of Patents No. 2,222,185 issued November 19, 1940, and 2,239,760 issued April 29, 1941.

A lens carrier 19 is supported by at least one or, preferably, two guide rods 20 and carries the enlarging lens 21. The guide rods 20 run in bearings 22. A focusing device comprising, for example, a rack and pinion movement or the like, not shown in detail, permits the operator to adjust the position of guide rods 20 and therewith of lens support 19 and lens 21 by simply turning hand wheel 23.

The enlarger as described up to this point is quite conventional, and does not depart appreciably from other well known designs.

The lamphousing consists of the following parts: A main housing 30, preferably an aluminum casting or the like, a condenser with a condenser housing 31 and condenser lenses 32, a diffuse reflector plate 33 supported by a rod 34 and movable by means of a rack 35 and a pinion 36, the entire reflector assembly being supported by a housing 37, and two spotlights adapted to illuminate this reflector plate. These spotlights comprise a specular reflector 40, a lamp 41 and means to adjust the position of the lamp with respect to the specular reflector. These means comprise a casting 42 which is brazed or otherwise fastened to the reflector 40, and a flange 42 adapted to receive the lamp socket 44 of lamp 41. As can be seen, the flange 43 is fastened to 42 by means of small screws. The holes for these screws are made larger than strictly necessary so that it becomes possible to shift flange 43 slightly with respect to the specular reflector 40. It is also possible to loosen set screw 45 and thereby change the longitudinal position of the lamp socket 44 with respect to flange 43. The combination of these two movements makes a complete adjustment of the filament of the lamp with respect to the specular reflector 40 possible.

The shape of the specular reflector can best be seen in Fig. 4. It consists of a rear part 50 which is a paraboloid body of rotation, a front part 51 which is an ellipsoid body of rotation and a short cylindrical part 52 which connects the two. Continuations of the parabola or ellipse, respectively, which form the two parts are shown in dotted lines. The lamp is so disposed that it is substantially in the focal point of the parabola and in one of the focal points of the ellipse and the diffuse reflector 33 is disposed substantially in the other focal point of the ellipse.

As can be seen in Fig. 4, the center lines of the two spotlights are offset with respect to the optical axis of the enlarger, but in different directions.

In order to obtain the most intense and the most nearly uniform illumination on the easel, it is necessary to provide an illuminated spot on the plate 33 which is of approximately 1½ to 2" diameter, depending upon the focal length and diaphragm opening of the enlarging lens, and to illuminate this spot with a substantially uniform light intensity per unit area. Failure to do so produces objectionable patterns of more or less bright spots on the easel, particularly when the lens is being stopped down. It is rather difficult to fulfill these conditions since all incandescent lamps are quite different from real point sources of light and since they all have filaments with appreciable physical dimensions. These filaments are arranged in a certain pattern and unless precautions are taken, these patterns will be discernible on plate 33 and also, at least to some extent, on the easel supporting the bromide paper. In order to eliminate these objectionable filament patterns without the use of light absorbing diffusing glass or the like, I resort to three expedients, singly or in combination:

First, I have found that a specular spotlight reflector with a partly ellipsoidal and partly paraboloid shape delivers a more nearly uniform spot than the purely ellipsoidal reflector used heretofore.

Second, I use, preferably, more than one spotlight. It will be clear that with one spotlight only the entire optical system becomes unsymmetrical and it is almost unavoidable that the light distribution on the easel also shows a slight but noticeable lack of symmetry, i. e., one side receives slightly more light than the other. The symmetry of the optical system can be restored by using at least two, but if necessary, three or four spotlights.

Third, these spotlights are preferably disposed in the manner shown in Fig. 4, i. e., their center lines are slightly offset with respect to the optical axis of the enlarger, but in different directions. The most common type of projecting lamp has two filaments and, therefore, projects a pattern on plate 33 consisting of two elongated bright spots. By using two spotlights in this offset manner the relatively dark portion between the bright spots of one spotlight will be covered by one of the bright spots of the other spotlight and vice versa. In this manner, a brightly illuminated spot can be formed on plate 33 which has the required dimensions and which is illuminated with substantially uniform intensity per unit area. It is then possible to stop down the diaphragm of the enlarging lens in the conventional manner without obtaining objectionable patterns on the easel.

While two or more spotlights give better results than only one spotlight for reasons mentioned above, it may be found advantageous to use only one spotlight in small size enlargers or in types where expense is paramount. I, therefore, do not wish to limit the scope of the invention to two or more lights but wish to include also the use of one spotlight only.

Referring to Fig. 2, a handwheel 60 is provided by means of which the operator through rack 36 and pinion 35 can raise or lower reflector plate 33. In the lowest position the reflector plate is substantially in the focal point of condensers 32 and it is also substantially in the focal point of the two spotlights. By raising it, it will assume, for example, the position shown in Fig. 3 in dotted lines. In this position the plate is considerably out of focus both with respect to the condensers 32 and the spotlights and, therefore, the amount of light reaching the condenser is considerably smaller. The defocusing with respect to the spotlights is far more important than the defocusing with respect to the condenser lens and the extremely large variation of the light obtainable with relatively small movements of the reflector is due to this fact. I have found that by raising the plate for a distance of approximately 2", on an enlarger adapted for 4 x 5" negatives, for instance, I can control the light intensity from its full value when the plate is in its extreme low position to a low intensity which is only approximately 4% of the aforementioned full intensity.

As can be seen, these means to control the light intensity are of extreme mechanical simplicity and they have the added advantage that the color of the light, i. e., the color temperature of the light is not affected. This device is distinguished favorably in this respect from an electric rheostat. Due to this mechanical simplicity, it becomes now possible to devise very simple automatic means by which the light intensity of the enlarger may be rendered independent of the distance of the projector, or more particularly, of the film stage of that projector from the bromide paper supported by the easel or the base plate 10. A device of this character is shown in Figs. 5 and 6. The reflector plate 33 in this case is not supported by the rack and pinion movement shown heretofore, but by two levers 70. These two levers are supported, respectively, on one end by shafts 71 and 72 and on the other end by shafts 73 and 74. Shafts 73 and 74 engage two lugs 75 which, in turn, support the reflector plate 33. The two shafts 71 and 72 are supported by a housing 76 which supports the entire reflector assembly. The lower of the two levers 70 is attached to shaft 72, as stated before, and a lever 77 is attached to the same shaft. This lever terminates in a cam following roller 78 which is in operative engagement with a cam 79. This cam is fastened to one of the steel channels 12.

The function of the device will be quite clear from Fig. 5. When the projector assembly moves upwards the enlarging ratio increases and, therefore, in an ordinary enlarger the light in the easel plane will decrease, roughly, in inverse proportion to the square of the magnification ratio. With this enlarger, however, the cam following roller 78 will follow the configuration of cam 79 and will in this instance move slightly to the right. Shaft 72 will thereby rotate slightly in a counter-clockwise direction carrying with it the two levers 70 and thereby lowering the reflector plate 33. Moving this reflector will bring it more nearly in focus with respect to the condenser and spotlights and will, therefore, increase the light output of the enlarger. If cam 79 has the proper configuration, the two factors may be made to cancel each other, i. e., the light may decrease due to the increased magnification ratio, but may increase due to the lowering of plate 33, and as a result of those two conflicting factors the light will remain constant.

It is hardly necessary to point out that an enlarger with a light output independent of the magnification ratio simplifies the enlarging technique very considerably. The operator now is saved all the tedious computations and estimates necessary heretofore to predict the exposure time because now, with a constant light output independent of the magnification ratio, any given negative will have a constant exposure time, if printed on a given type of bromide paper.

Various changes in the form, proportion and minor details of parts may be resorted to without departing from the principles or sacrificing any of the advantages of the invention as defined in the appended claim.

What I claim as new is:

In a photographic enlarger which comprises a supporting structure and a base and a projector assembly mounted slidably on said structure including a support for a photographic negative, an enlarging lens in front of said negative, which projects an image of said negative upon said base, a focusing movement for adjusting the distance of said lens from said negative, a condenser behind said negative, and an illuminating system comprising an opaque diffuse reflector with a diffusely reflecting white surface positioned behind said condenser on its optical axis and substantially at its focal point, whereby an image of said diffuse reflector is projected by said condenser into the pupil of said enlarging lens, and at least one spotlight, offset with respect to the optical axis of said condenser, pointing toward said diffuse white reflector and adapted to illuminate a selected area thereon, comprising a source of light and a light collecting specular reflector which is at least partially an elliptic body of rotation, said source of light being positioned in one and said diffuse reflector normally being positioned in the other of the two focal points of said ellipse, means to keep the intensity of the light impinging upon said base constant regardless of the distance of said projector from said base, said means comprising a cam mounted on said structure, and a mechanism, including a cam following element in operative contact with said cam, adapted to adjust automatically the position of said diffuse white reflector relative to said spotlight, whereby the specular spotlight reflector is focused upon said diffuse white reflector in its normal position, when the distance of said projector from said base is largest, but is progressively defocused when said distance becomes smaller.

LOUIS L. WEISGLASS.

REFERENCES CITED

The following references are of record in the file of this patent:

UNITED STATES PATENTS

| Number | Name | Date |
|---|---|---|
| 247,230 | Wheeler | Sept. 20, 1881 |
| 1,223,459 | Whitney | Apr. 24, 1917 |
| 1,653,838 | Zimmerman | Dec. 25, 1927 |
| Re. 17,038 | Ballman et al. | July 17, 1928 |
| 1,864,696 | Steele et al. | June 28, 1932 |
| 1,887,650 | Larner | Nov. 15, 1932 |
| 1,985,398 | Berthon | Dec. 25, 1935 |
| 2,117,754 | Bell | May 17, 1938 |
| 2,124,954 | Pirmov | July 26, 1938 |
| 2,176,573 | Hershberg | Oct. 17, 1939 |
| 2,186,619 | Sauer | Jan. 9, 1940 |
| 2,198,014 | Ott | Apr. 23, 1940 |
| 2,238,003 | Beck et al. | Apr. 8, 1941 |
| 2,349,260 | Garraway | May 23, 1944 |